(12) United States Patent
Sieve (10) Patent No.: US 7,097,381 B2
(45) Date of Patent: Aug. 29, 2006

(54) JOINT

(75) Inventor: Manfred Sieve, Lohne (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/468,626

(22) PCT Filed: Nov. 20, 2002

(86) PCT No.: PCT/DE02/04276

§ 371 (c)(1),
(2), (4) Date: Aug. 19, 2003

(87) PCT Pub. No.: WO03/045717

PCT Pub. Date: Jun. 5, 2003

(65) Prior Publication Data

US 2004/0071500 A1    Apr. 15, 2004

(30) Foreign Application Priority Data

Nov. 20, 2001   (DE) ................................. 101 56 548

(51) Int. Cl.
*F16C 11/00*   (2006.01)
(52) U.S. Cl. ..................... 403/123; 403/77; 403/128

(58) Field of Classification Search .................. 403/77, 403/122, 123, 128, 133, 135; 280/93.511
See application file for complete search history.

(56) References Cited

U.S. PATENT DOCUMENTS

| | | | | |
|---|---|---|---|---|
| 4,034,996 A | * | 7/1977 | Manita et al. | 280/80.1 |
| 4,575,162 A | * | 3/1986 | Smith | 384/2 |
| 6,059,480 A | * | 5/2000 | Maughan et al. | 403/131 |
| 6,206,604 B1 | * | 3/2001 | Dembowsky et al. | 403/135 |

FOREIGN PATENT DOCUMENTS

| | | |
|---|---|---|
| DE | 40 35 614 | 5/1992 |
| EP | 0 317 792 | 5/1989 |

* cited by examiner

*Primary Examiner*—Daniel P. Stodola
*Assistant Examiner*—Michael P Ferguson
(74) *Attorney, Agent, or Firm*—McGlew and Tuttle, PC (57) ABSTRACT

A joint for the movable connection of two components of a motor vehicle, which are movable in relation to one another, with a housing (1) and with a bearing shell (2) accommodated in the housing (1) for the slidingly movable mounting of a mount body (3) is presented, wherein the mount body (3) has a bearing surface (4) curved complementarily to the bearing shell inner surface and passes over at least on one side into a pin neck (5), which has a connection area (6) for connection to a bearing journal (7).

12 Claims, 7 Drawing Sheets

JOINT

FIELD OF THE INVENTION

The present invention pertains to a joint for the movable connection of two components of a motor vehicle, which are movable in relation to one another.

BACKGROUND OF THE INVENTION

Such joints are currently used, e.g., as "sleeve joints" for mounting stabilizers in motor vehicles. The designation "sleeve joint" is derived from the mount body present in the mount, which is designed as a sleeve in prior-art embodiments, so that it has a through hole. The sleeve joints known from the state of the art have a mount body with a spherically shaped bearing surface. This is accommodated in a complementarily shaped bearing shell inner surface of the bearing shell and is guided therein in a slidingly movable manner. For example, a bolt, which is used to fasten the joint to a motor vehicle component, is passed through the through hole of the mount body.

However, the problem arises that the space necessary for introducing and fixing the bolt in the area of the wheel suspension is very limited. Thus, the installation of prior-art joints in the motor vehicle is rather difficult.

Moreover, it was observed that the cross section of the prior-art sleeve joints is weakened due to the through hole prepared in the mount body, and this weakening must be compensated by the application of additional material on the outer circumference of the mount body in order to reach the required strength values of the component. The prior-art joint designs correspondingly have a considerable overall volume and consequently require more space for installation in the area of the wheel suspension than would be desirable.

SUMMARY OF THE INVENTION

The basic object of the present invention is to make available a joint that has a compact design and can be preferably connected to a motor vehicle component from one side, so that its installation is simplified.

Accordingly, a joint according to the present invention for the movable connection of two components of a motor vehicle, which are movable in relation to one another, has a housing and a bearing shell accommodated in the housing for the slidingly movable mounting of a mount body. The mount body is provided with a bearing surface curved complementarily to the bearing shell inner surface and is thus accommodated in the bearing shell in a slidingly movable manner. On at least one side, the mount body has a pin neck, and the bearing surface passes over into the pin neck. The pin neck has a connection area for connecting the mount body to a bearing journal.

Due to a mount body being equipped with a connection area, it becomes possible to connect a bearing journal to be mounted on the mount body to the mount body in a very short time, so that the time needed for installing a joint according to the present invention becomes shorter. In addition, the installation of the joint in the motor vehicle is simplified. The joint has a small overall size and is consequently very compact.

In a preferred embodiment of the present invention, the mount body has two pin necks arranged diametrically to each other, and the curved bearing surface is a joint ball. Thus, the mount body has an outer geometry similar to the prior-art sleeve joint inner parts. Unlike in the prior-art designs of the sleeve joint inner parts, the mount body is not provided with a through hole in the joint according to the present invention, but it has only a connection area for connection to the bearing journal, which is preferably provided on the pin neck.

Both connections by material bonding (to integrate structurally) and positive-locking connections may be selected for connecting the pin neck of the mount body to the bearing journal. Moreover, a combination of connection by material bonding and positive-locking connection is possible and can be embodied in the sense of the present invention.

Thus, corresponding to a variant of the present invention, the connection by material bonding between the pin neck and the bearing journal may be a welded connection or a bonded connection. Processes such as friction welding or resistance pressure welding are possible for preparing the welded connection.

A positive-locking connection between the pin neck and the bearing journal may, moreover, be designed such that at least one pin, which passes through an opening of a flange present at the bearing journal and is placed on the flange on the opposite side of the flange by means of deformation of the material, is made in one piece with the pin neck. A nondetachable connection, which meets very high requirements in terms of fatigue strength, is thus obtained between the bearing journal and the pin neck.

Another possibility of preparing the connection between the pin neck and the bearing journal is to make a connection pin, whose geometry, which deviates from a regular cylindrical shape at least in some sections, is fitted into a complementary recess of the bearing journal, in one piece with the pin neck. The reverse case can also be readily embodied in the sense of the present invention. Thus, a recess may be prepared in the pin neck, and a connection pin having a geometry deviating from the regular cylindrical shape at least in some sections is then introduced into the said recess.

In other words, the pin neck of the mount body is thus connected to the bearing journal by a connection pin being present on the first component and by a corresponding recess being prepared in the other component. Thus, a deformation process may be used as the manner of connecting the components indicated. Furthermore, it is possible to prepare the connections by means of a press fit or, in the simplest case, to provide a thread on the connection pin, which thread can be screwed into a fitting internal thread of the recess. Moreover, combined with the positive-locking connection, a connection by material bonding may be selected for the permanent, nondetachable fixation of the mount body on the bearing journal. This is possible, but not absolutely necessary in the sense of the present invention.

Moreover, a variant of the present invention is seen in that a contour for the action of a tool or a tool engagement contour is provided on the bearing journal and/or the mount body. This tool action contour or tool engagement contour permits the simplified mounting of the joint according to the present invention as well as facilitated installation in the wheel suspension of a motor vehicle. The tool action contour or tool engagement contour is used as a holder for a tool while the bearing journal is being connected to the bearing body. If this connection comprises the above-mentioned threaded connection, the tool engagement contour or tool action contour offers an ideal possibility of holding the components in this case.

Two preferred embodiments of a joint according to the present invention will be described in greater detail below on the basis of the views in the figures.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
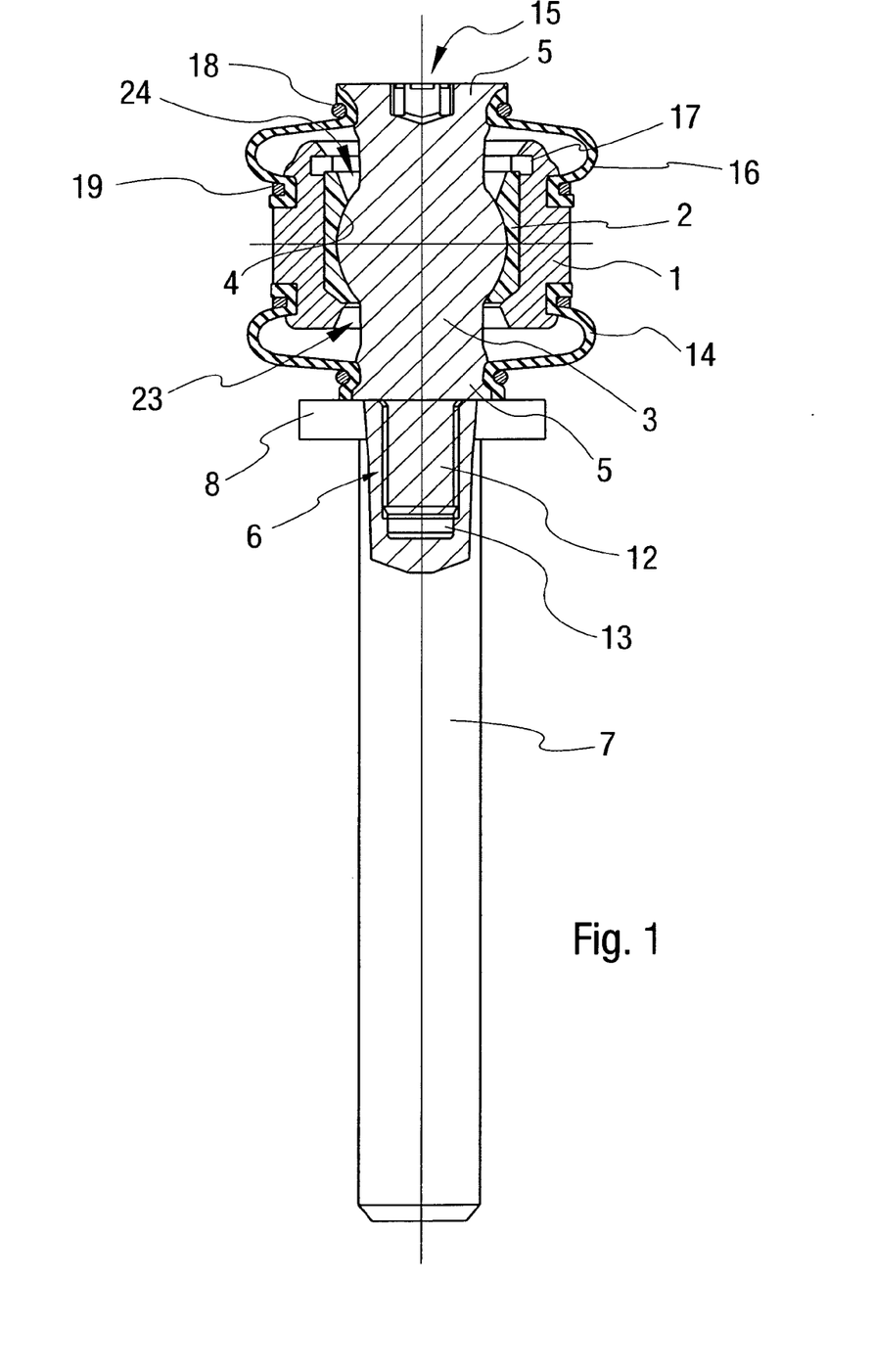
FIG. 1 is a partial sectional view through a first joint according to the present invention.

Referring to the drawings in particular, FIG. 1 shows an embodiment of a joint according to the present invention. This joint comprises a housing 1 and a bearing shell 2 inserted into the housing. The bearing shell accommodates a curved, here spherically shaped bearing surface 4 of a mount body 3, which said bearing surface is rotatably or tiltably movable. The bearing shell 2 has a bearing shell inner surface curved complementarily to the bearing surface 4 for this purpose.

The housing 1 of the joint shown in FIG. 1 has two housing openings 23, 24 and is open on both sides. The housing 1 has on one side a collar, which is directed toward the inside of the joint and at which the bearing shell 2 is supported in the axial direction of the joint. On the opposite side, the bearing shell 2 is fixed in the housing 1 by means of a securing ring 17. The bearing shell 2 is fixed in the known manner by the deformation of an edge of the housing, so that the securing ring is thus locked in a groove of the housing.

The mount body 3 has a pin neck 5 each on both sides of the curved bearing surface 4 designed as a joint ball. As can be recognized in the upper part of FIG. 1, a tool engagement contour 15 was prepared in the pin neck 5 of the mount body 3. This tool engagement contour 15 comprises in this case a hexagonal recess or a hexagonal round recess (Torx) for attaching a corresponding tool wrench. In the lower part of the mount body 3, the mount body is provided with a connection area 6. In the embodiment of a joint according to the present invention shown in FIG. 1, the connection area comprises a connection pin 12, which is made in one piece with the mount body 3 and is made integrally with the mount body 3 and is screwed with a corresponding external thread 20 (see FIG. 2) intro a corresponding internal thread 21 (see FIG. 3) of the bearing journal 7. To prepare the internal thread 21 in the bearing journal 7, a recess 13 is prepared in the bearing journal in advance. To improve the contact between the mount body 3 and the bearing journal 7, a flange 8 is present in the contact area of the said components. A sealing bellows 14, on the one hand, and, on the other hand, another sealing bellows 16 are used to seal the sensitive components of the joint. The sealing bellows 14 and 16 are fixed directly on the pin neck 5 by means of respective straining rings 18 and 19, on the one hand, and in a groove of the housing, on the other hand. The pin necks 5 of the mount body pass through the housing openings 23 and 24 in the axial direction and project from the housing 1 on both sides, so that the tool engagement contour 15 and the connection area 6 can be used here to mount the joint as well as to install it in the motor vehicle.

Figure 2:
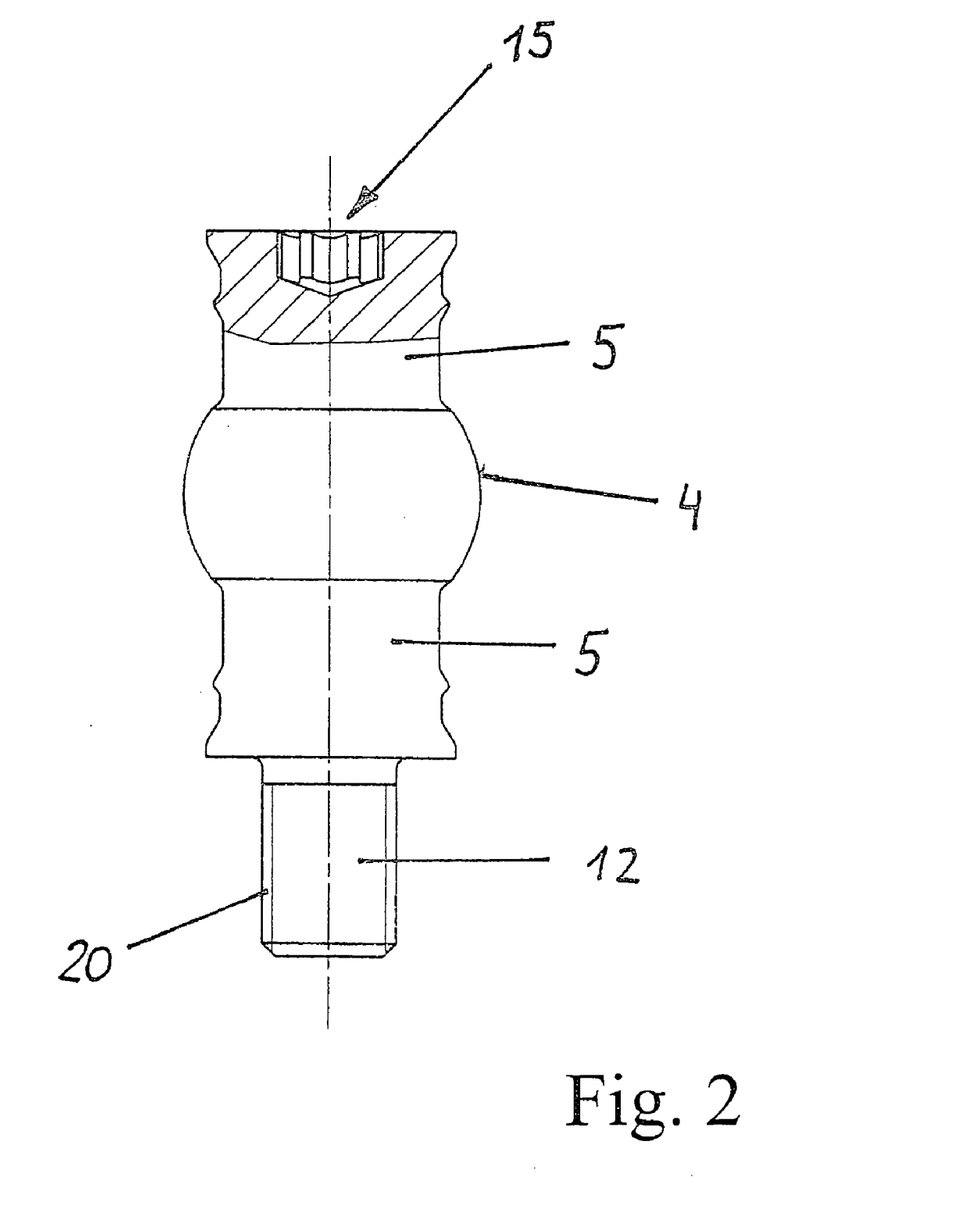
FIG. 2 is a partially cut-away mount body as an individual part.

A mount body 3 of the joint according to the present invention, which is described in FIG. 1, is shown as an individual part once again in FIG. 2 for better illustration. This mount body 3 has on one side a connection pin 12, which was provided with an external thread 20. This connection pin 12 is made integrally with the mount body 3 and is made on one side in one piece with a part of the mount body 3, which part is designed as a pin neck 5. On the side of the mount body 3 located opposite the connection pin 12, the mount body has, moreover, a tool engagement contour 15 for attaching a tool wrench.

Figure 3:
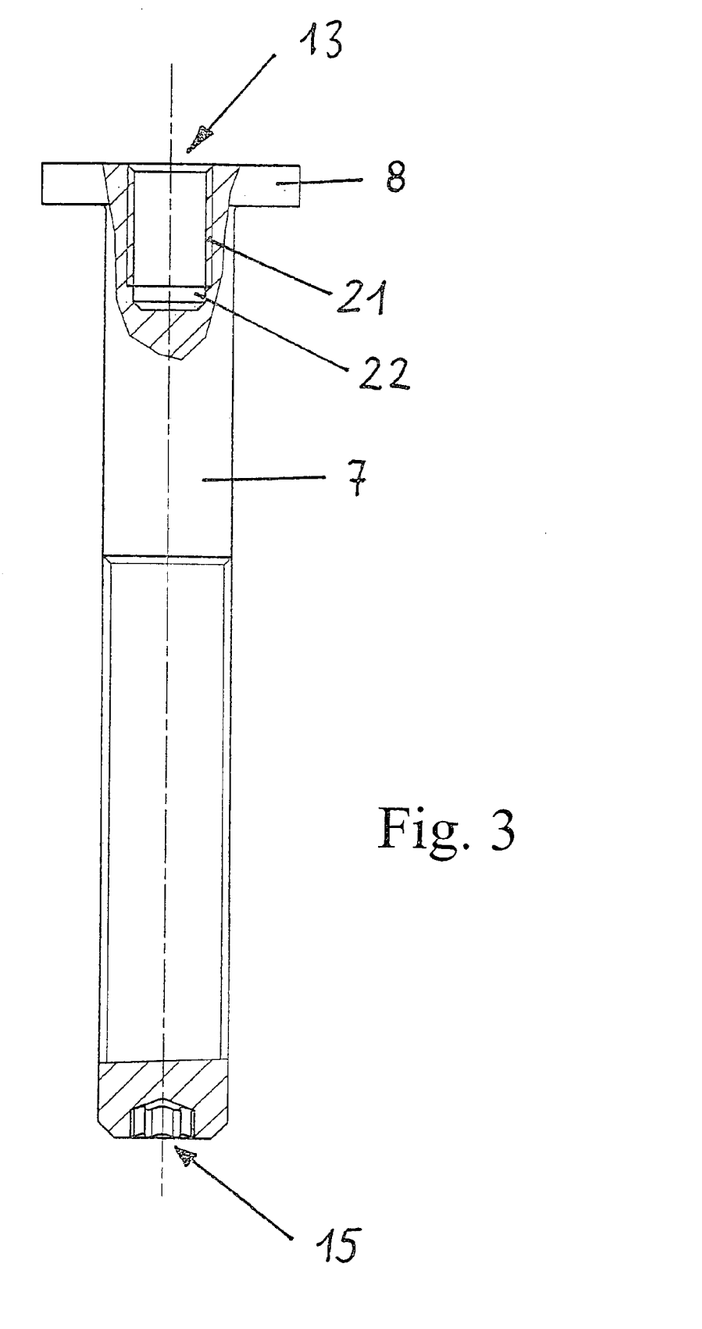
FIG. 3 is a partially cut-away view of a bearing journal.

Moreover, FIG. 3 shows a partially cut-away view of a bearing journal 7 of the embodiment of a joint shown in FIG. 1. The partial section clearly shows the blind hole 22 prepared in the bearing journal 7, in which blind hole an internal thread 21 was prepared. To improve the contact between the pin neck 5 of the mount body 3 and the bearing journal 7, a flange 8 is made in one piece with the bearing journal 7. Furthermore, a tool engagement contour 15, which has a shape similar to that of the tool engagement contour shown in FIG. 2, is prepared on the side located opposite the flange 8 in the embodiment of a bearing journal 7 shown here.

Figure 4:
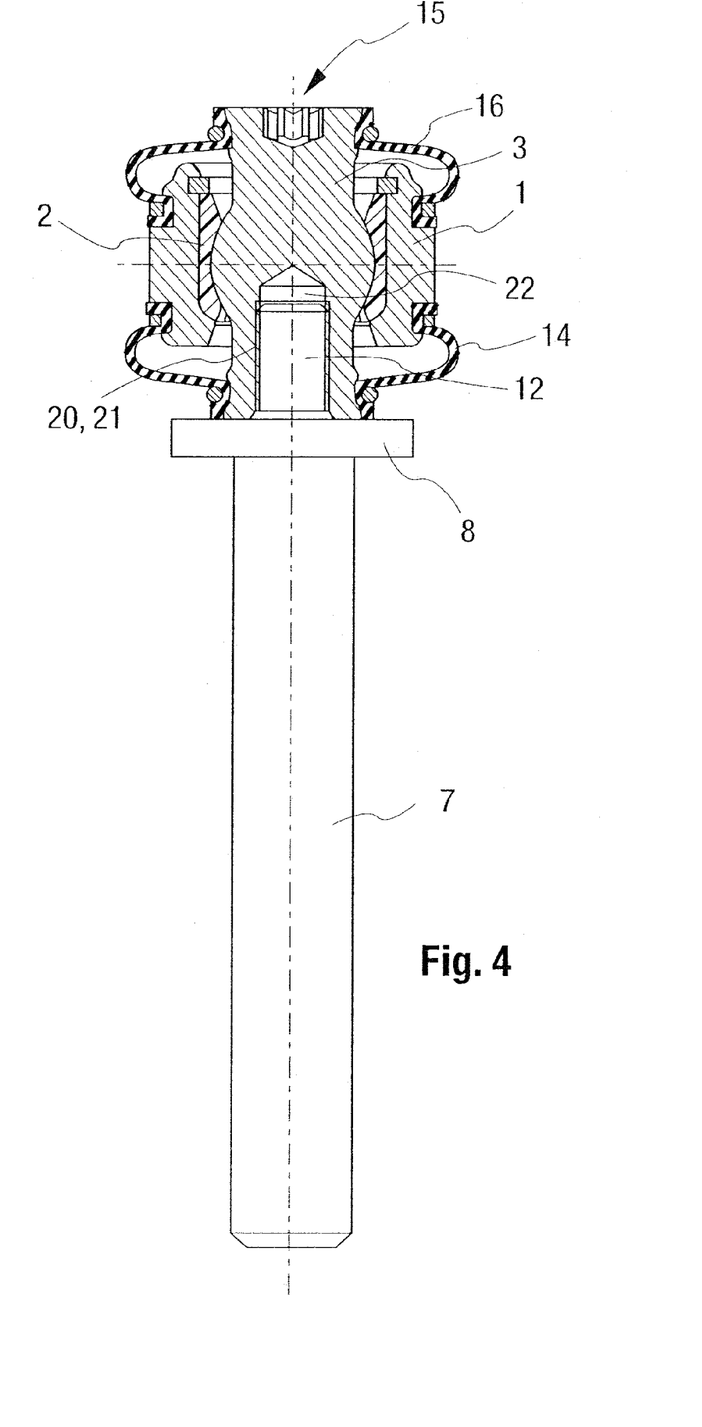
FIG. 4 is a sectional view through another embodiment of a joint according to the present invention.

Another possible embodiment of a joint according to the present invention is shown in a partial sectional view in FIG. 4. The design of this joint is basically similar to that of the joint shown, and the same reference will therefore also be used to designate identical components.

Unlike in the view in FIG. 1, the mount body 3 has a recess 13, which was prepared only to a defined depth in the mount body 3. This recess 13, prepared as a blind hole 22, has, moreover, an internal thread 21. A connection pin 12, on which a corresponding external thread 20 is present, can be screwed into this internal thread until the face of the pin neck 5 of the mount body 3 comes into contact with the flange 8 of the bearing journal 7, on which the connection pin is present and secure locking of the components to be connected is thus made possible as a consequence of the self-locking of the thread.

Figure 5:
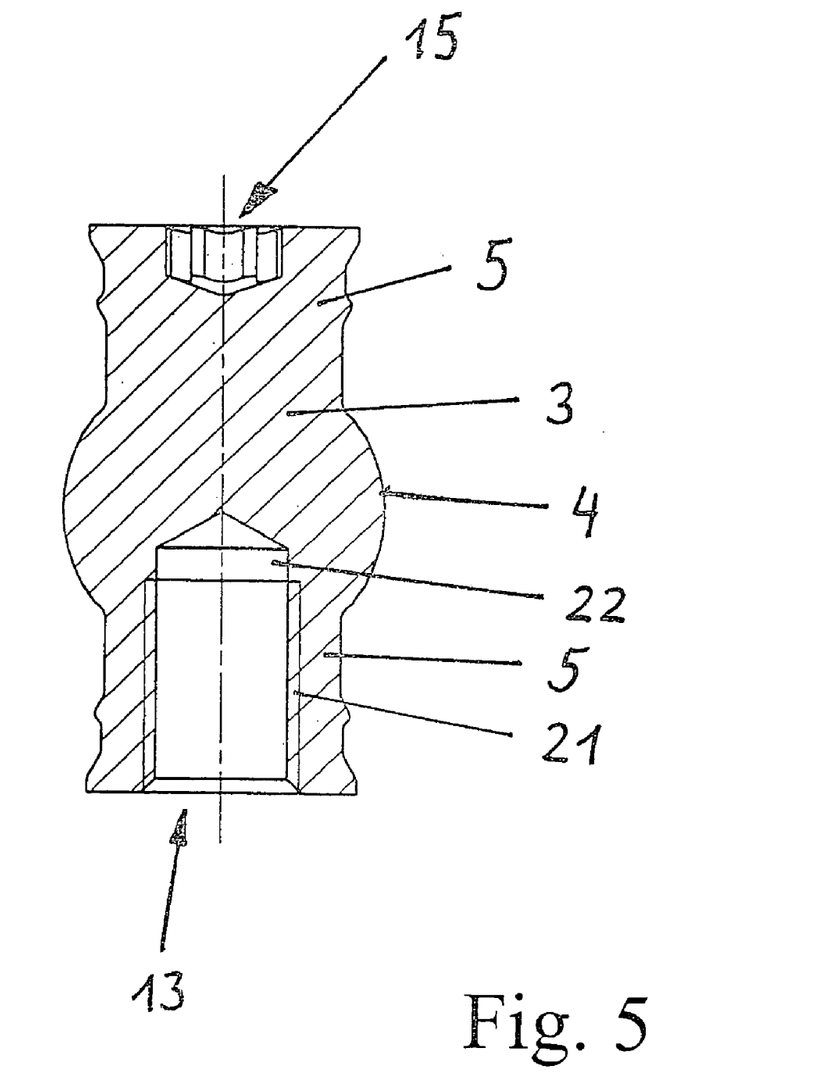
FIG. 5 is a section through the mount body of a joint according to FIG. 4.

As is apparent from FIG. 5, in which a sectional view of the mount body 3 of a joint according to FIG. 4 is shown, the mount body 3 also has a tool engagement contour 15 on the side located opposite the connection area 6. Since the recess 13 is not a through hole, higher strength values can be obtained with the embodiments being shown here along with reduced dimensions than was hitherto possible in prior-art joints.

Figure 6:
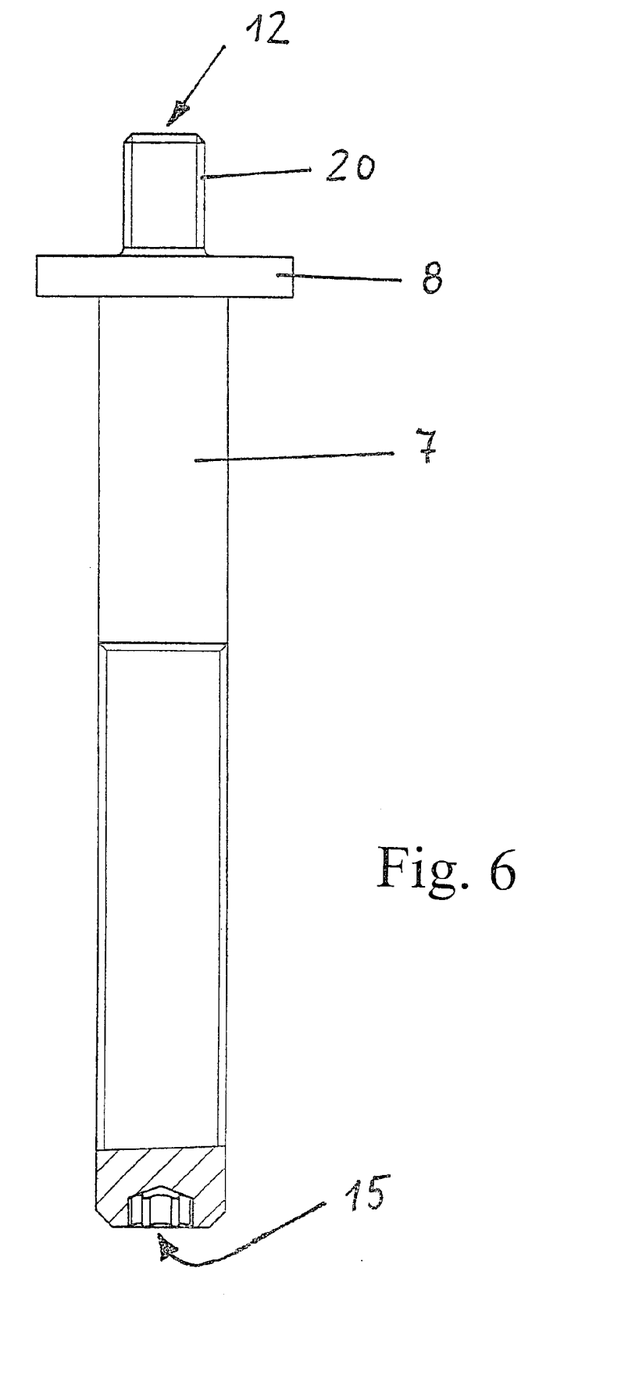
FIG. 6 is a partially cut-away bearing journal of the joint shown in FIG. 4.

FIG. 6 once again shows a bearing journal 7, which has in the partial section a tool engagement contour 15, on the one hand, and, located opposite this above the flange 8, a connection pin 12, whose external thread 20 can be screwed into the above-described internal thread 21 of the mount body 3 until the face of the pin neck 5 of the mount body 3 comes into contact with the flange 8. Moreover, the tool engagement contour 15 is used to facilitate the installation of the joint in the wheel suspension of a motor vehicle.

Figure 7:
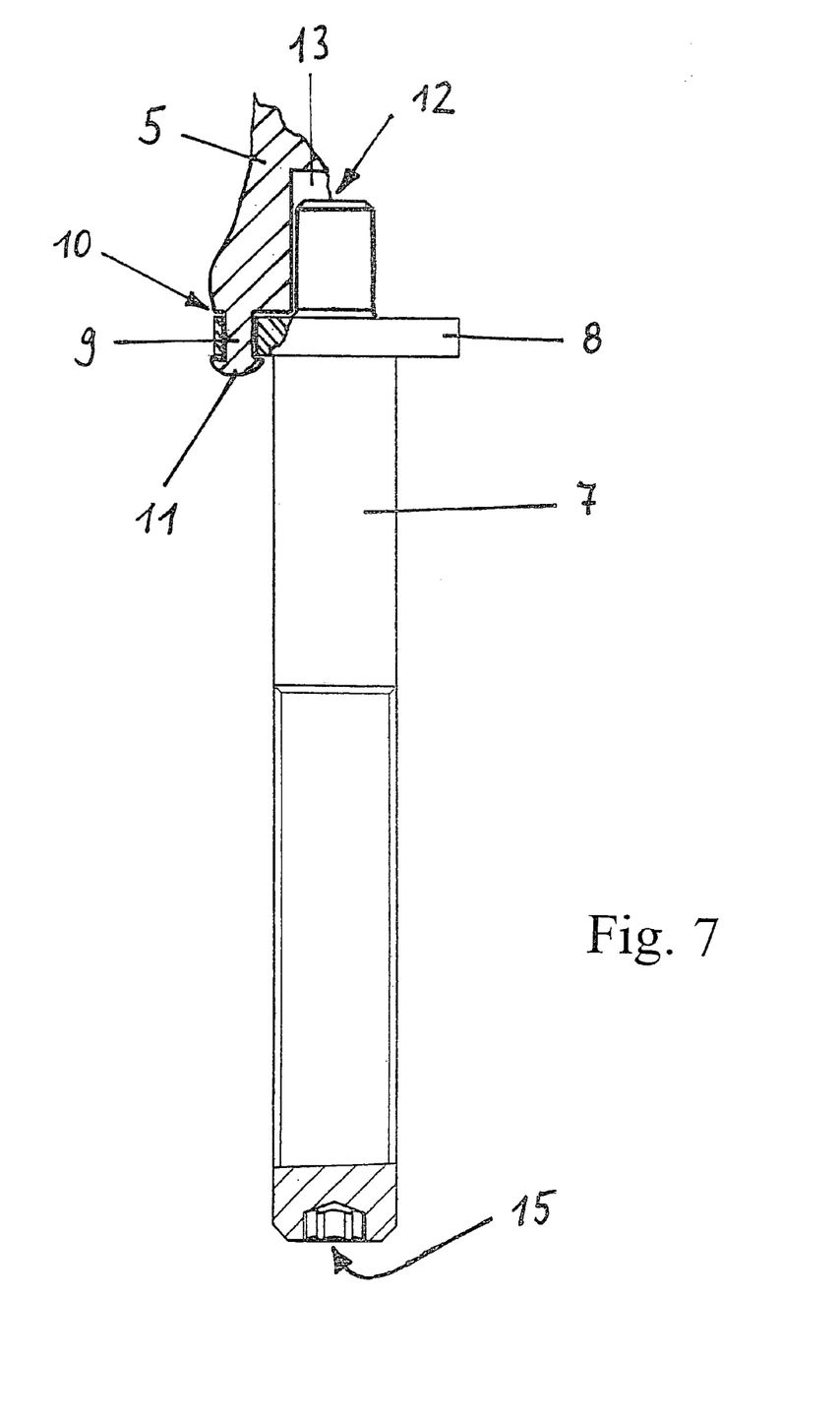
FIG. 7 shows a partial section through another joint.

Furthermore, FIG. 7 shows a detail of the connection area between the bearing journal 7 and the mount body 3, as can also be applied in a meaningful manner. The pin neck 5 has a recess 13 here, into which a connection pin 12 is inserted. The connection pin and the recess have complementary regular cylindrical contours. A plurality of openings 10, through which pins 9 made in one piece with the pin neck 5 pass, are prepared in the flange 8 on the bearing journal 7, distributed over its circumference. On the side located opposite the pin neck 5, these pins 9 have a material deformation 11, so that they guarantee a permanent connection between the bearing journal 7 and the mount body 3.

While specific embodiments of the invention have been shown and described in detail to illustrate the application of the principles of the invention, it will be understood that the invention may be embodied otherwise without departing from such principles.

The invention claimed is:

1. A joint for the movable connection of two components of a motor vehicle, which are movable in relation to one another, the joint comprising:
   a housing having a first open end and a second open end;
   a bearing shell accommodated in said housing, said bearing shell having a bearing shell inner surface;
   a bearing journal;
   a mount body slidingly movably mounted in said bearing shell, said mount body having a bearing surface which is curved complementarily to said bearing shell inner surface, said mount body passing over on one side into a first side pin neck and on another side into a second side pin neck, said first side pin neck having a connection area integrally formed with said first side pin neck of said mount body, said first side pin neck protruding outside said housing through said first open end with said connection area connected to said bearing journal, and said second side pin neck protruding outside said housing through said second open end, said first side pin neck being connected to said bearing journal in a positive-locking manner utilizing a connection pin formed integrally with said first side pin neck as part of said connection area, wherein said connection pin is fitted into a recess of said bearing journal and held by threading on said pin and in said recess.

2. A joint in accordance with claim 1, wherein said pin necks are arranged diametrically opposite to each other and said bearing surface forms a joint ball.

3. A joint in accordance with claim 1, wherein said second side pin neck of said mount body and/or said bearing journal has a tool action contour or a tool engagement contour.

4. A joint according to claim 1, wherein said second side pin neck has a tool action contour on a side located opposite said connection area.

5. A joint according to claim 4, wherein said tool action contour is a tool engagement contour.

6. A joint according to claim 5, wherein said tool engagement contour is a hexagonal recess or a hexagonal round recess.

7. A joint according to claim 5, wherein said bearing journal has another tool engagement contour prepared on a side located opposite said connection area.

8. A joint according to claim 1 wherein said bearing journal has a cylindrical body and a ring-shaped flange at an end facing said mount body, and the outer diameter of said flange is greater than the outer diameter of the cross-section of said cylindrical body.

9. A joint according to claim 8, wherein said bearing journal has a tool engagement contour on a side located opposite said flange.

10. A joint according to claim 1, wherein said mount body has a tool engagement contour on a side located opposite said connection area, said bearing journal has a ring-shaped flange surrounding said recess, and said bearing journal has another tool engagement contour on a side located opposite said flange.

11. A joint according to claim 10, wherein each of said tool engagement contours is a hexagonal recess or a hexagonal round recess.

12. A joint for the movable connection of two components of a motor vehicle, which are movable in relation to one another, the joint comprising:
   a housing having a first open end and a second open end;
   a bearing shell accommodated in said housing, said bearing shell having a bearing shell inner surface;
   a bearing journal;
   a mount body slidingly movably mounted in said bearing shell, said mount body having a bearing surface which is curved complementarily to said bearing shell inner surface, said mount body passing over on one side into a first side pin neck and on another side into a second side pin neck, said first side pin neck having a connection area integrally formed with said first side pin neck of said mount body, said first side pin neck protruding outside said housing through said first open end with said connection area connected to said bearing journal, and said second side pin neck protruding outside said housing through said second open end, said bearing journal having a cylindrical body and a ring-shaped flange at an end facing said mount body, and the outer diameter of said flange is greater than the outer diameter of the cross-section of said cylindrical body, said bearing journal having a tool engagement contour on a side located opposite said flange.

\* \* \* \* \*